US012627139B2

(12) United States Patent
Chavan et al.

(10) Patent No.: US 12,627,139 B2
(45) Date of Patent: May 12, 2026

(54) SYSTEMS AND METHODS OF POWER-VOLTAGE DROOP CONTROL FOR A DIRECT CURRENT (DC) MICROGRID

(71) Applicant: ABB Schweiz AG, Baden (CH)

(72) Inventors: Govind Sahadeo Chavan, Raleigh, NC (US); Li Qi, Raleigh, NC (US); Samy Gamal Faddel Mohamed, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 186 days.

(21) Appl. No.: 18/538,776

(22) Filed: Dec. 13, 2023

(65) Prior Publication Data

US 2025/0202228 A1     Jun. 19, 2025

(51) Int. Cl.
*H02J 1/102*        (2026.01)
*H02M 1/00*        (2006.01)

(52) U.S. Cl.
CPC ........... *H02J 1/102* (2013.01); *H02M 1/0025* (2021.05)

(58) Field of Classification Search
CPC .............................. H02J 1/102; H02M 1/0025
See application file for complete search history.

(56) References Cited

U.S. PATENT DOCUMENTS

2021/0098990 A1*  4/2021  Peng ......................... H02J 3/32

FOREIGN PATENT DOCUMENTS

| | | | | |
|---|---|---|---|---|
| CN | 108512452 A | | 9/2018 | |
| CN | 111327042 A | * | 6/2020 | ................ H02J 1/10 |
| CN | 111864723 A | * | 10/2020 | ................ H02J 1/10 |
| CN | 113708359 A | * | 11/2021 | ............ H02J 7/0016 |
| KR | 10-2023-0164295 A | | 12/2023 | |

OTHER PUBLICATIONS

Machine translation of CN 113708359 by Clarivate Analytics, Aug. 2025, 18 pages.*
Machine translation of CN 111864723 by Clarivate Analytics, Aug. 2025, 10 pages.*
Machine translation of CN 111327042 by Clarivate Analytics, Aug. 2025, 8 pages.*

(Continued)

*Primary Examiner* — Harry R Behm
(74) *Attorney, Agent, or Firm* — McCarter & English, LLP

(57)        ABSTRACT

A direct current (DC) microgrid is provided. The microgrid includes a power converter, a power-voltage (PV) droop control loop, and an inner current control loop of the power converter. The PV droop control loop is configured to receive measurements of a droop current quantity that is not a DC bus current of the DC microgrid. The droop current quantity is used to determine a droop power quantity selected as a power quantity in a PV relationship. The PV droop control loop is further configured to derive a current reference based on droop in the droop power quantity. The inner current control loop is configured to control operation of the power converter by deriving a measured current corresponding to the control quantity based on the measurements of the droop current quantity, directly comparing the current reference with the measured current, and generating switching signals of switches in the power converter.

20 Claims, 12 Drawing Sheets

(56)  References Cited

OTHER PUBLICATIONS

Guangyuan Liu, Tommaso Caldognetto, Paolo Mattavelli; Power-Based Droop Control in DC Microgrids Enabling Seamless Disconnection from AC Grids, Jun. 2017, pp. 523-528.*

Jia et al., An improved droop control method for reducing current sensors in DC microgrid. IEEE 2017 Chinese Automation Congress. 4645-4649.

Extended European Search Report for Application No. 24219421, dated Jul. 14, 2025, 11 pages.

F. Gao, et al., "Comparative Stability Analysis of Droop Control Approaches in Voltage-Source-Converter-Based DC Microgrids", IEEE Trans on Power Electronics, vol. 32, No. 3, Mar. 2017.

B. Zhang, F. Gao, Y. Zhang, D. Liu, H. Tang, "An AC-DC Coupled Droop Control Strategy for VSC-Based DC Microgrids", IEEE Trans on Power Electronics, vol. 37, No. 6, Jun. 2022.

Korean Office Action for Application No. 10-2024-0184395, dated Feb. 1, 2026, 4 pages.

* cited by examiner

200

SYSTEMS AND METHODS OF POWER-VOLTAGE DROOP CONTROL FOR A DIRECT CURRENT (DC) MICROGRID

BACKGROUND

The field of the disclosure relates generally to microgrids, and more particularly, to systems and methods of control for a direct current (DC) microgrid.

A microgrid is a local electrical grid and may be operated in a grid-connected mode by being connected to the macrogrid and in an island mode by being disconnected from the macrogrid and functioning autonomously. In a DC microgrid, the bus current of the microgrid is DC. One method of controlling the output of a DC microgrid is power-voltage (PV) droop control, which regulates the output DC side power as a function of the DC bus voltage of the microgrid. Known systems and methods of PV droop control are disadvantaged in some aspects and improvements are desired.

BRIEF DESCRIPTION

In one aspect, a direct current (DC) microgrid is provided. The microgrid includes a power converter, a power-voltage (PV) droop control loop electrically coupled with the power converter, and an inner current control loop of the power converter. The PV droop control loop is configured to receive measurements of a droop current quantity that is a current quantity other than a DC bus current of a DC microgrid. The droop current quantity is used to determine a droop power quantity selected as a power quantity in a PV relationship between the power quantity and a DC bus voltage of the DC microgrid in a PV droop control of the DC microgrid. The PV droop control loop is further configured to derive a current reference based on droop in the droop power quantity, the current reference corresponding to a control quantity of the inner current control loop of the power converter. The inner current control loop of the power converter is electrically coupled with the power converter and the PV droop control loop. The inner current control loop is configured to control operation of the power converter by deriving a measured current corresponding to the control quantity based on the measurements of the droop current quantity, directly comparing the current reference with the measured current, and generating switching signals of switches in the power converter based on the comparing.

In another aspect, a method of PV droop control in a DC microgrid is provided. The method includes selecting a droop power quantity as a power quantity in a PV relationship between the power quantity and a DC bus voltage of a DC microgrid in a PV droop control of the DC microgrid. The droop power quantity is based on a droop current quantity that is a current quantity other than a DC bus current of the DC microgrid. The method also includes deriving a current reference based on droop in the droop power quantity, the current reference corresponding to a control quantity of an inner current control loop of a power converter. The method further includes deriving a measured current corresponding to the control quantity based on measurements of the droop current quantity. In addition, the method includes controlling operation of the power converter by in the inner current control loop, directly comparing the current reference with the measured current, and generating switching signals of switches in the power converter based on the comparing.

BRIEF DESCRIPTION OF DRAWINGS

These and other features, aspects, and advantages of the present disclosure will become better understood when the following detailed description is read with reference to the accompanying drawings in which like characters represent like parts throughout the drawings.

DETAILED DESCRIPTION

The disclosure includes power-voltage (PV) droop control for a direct current (DC) microgrid. Method aspects will be in part apparent and in part explicitly discussed in the following description.

Figure 1A:
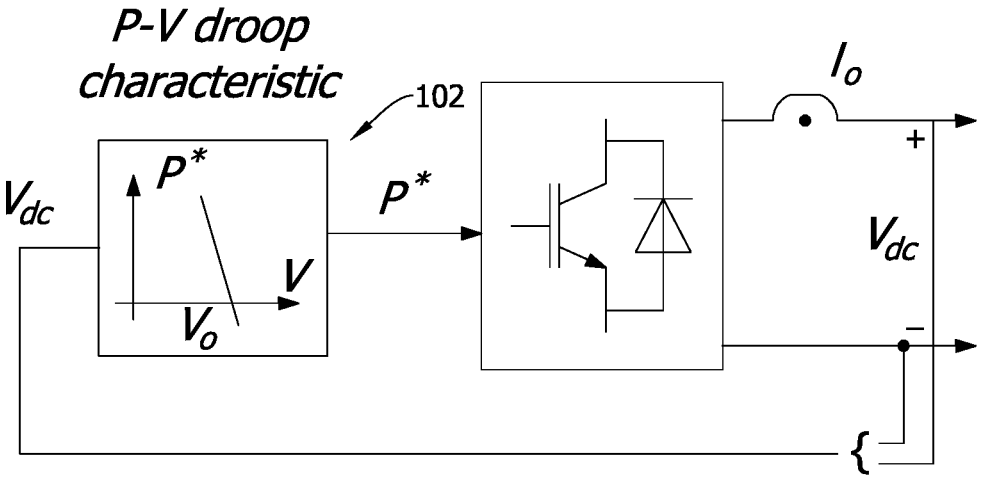
FIG. 1A shows a known power-voltage (PV) droop control mechanism.

FIGS. 1A-1D show known methods of droop control in a DC microgrid. FIG. 1A is a schematic diagram of a known power-voltage (PV) droop control mechanism. Droop control is used to control power flow between converters, loads, and power sources in a microgrid. Droop control regulates the power sourced and consumed by converters, loads, and power sources in the microgrid as a function of the DC bus voltage of the microgrid. As used herein, a DC bus voltage of a DC microgrid refers to the output voltage of the microgrid measured across the DC output bus of the microgrid. A DC bus current of a DC microgrid refers to the output current of the DC microgrid measured at the output bus of the microgrid. In a PV droop control, the droop in DC power output of power converters is proportional to the droop in voltage measured across the DC capacitance, and the output DC side power is regulated as a function of the DC bus voltage. The proportion in the PV relationship between the DC bus voltage and the DC side power is a droop gain k. In known PV droop control mechanisms (see FIGS. 1B and 1D), DC side quantities are used as inputs and a DC current reference is generated. The known PV droop equation is given as Eqn. (1).

$$P_{dc} = P_{dc0} + \frac{V_0 - v}{k}. \tag{1}$$

$V_0$ is the DC voltage reference and the DC bus voltage when no load is connected to the DC bus. k is the droop gain or the inverse of the slope of the P-V line in the P-V droop characteristic plot 102. v is the DC bus voltage of the microgrid.

The DC side current reference $i^*_{dc}$ may be derived based on Eqn. (2) below.

$$i^*_{dc} = \frac{V_0 - v}{k \times v}. \tag{2}$$

The DC bus voltage v is measured using a voltage sensor, and used to generate DC side current reference $$i^*_{dc}.$$

PV droop control loop 103 is used to generate DC side current reference $$i^*_{dc}.$$

In the known PV droop control for an alternate current (AC) to direct current (DC) (AC/DC) converter or rectifier 104 (see FIG. 1B), the DC side current reference $$i^*_{dc}$$

is input into an outer current control loop or an extra control loop 106 such as a PI (proportional integral) controller to generate a d-axis current reference $$i^*_d$$

as follows:

$$i^*_d = \left( \frac{K_{pdc}s + K_{idc}}{s} \right)(i^*_{dc} - i_{dc}). \tag{3}$$

The three-phase AC electrical quantities $i_{a,b,c}$ and $e_{a,b,c}$ of current i and voltage e may be converted to representation in a rotating reference frame of d-q axes to derive a d-axis current $i_d$ or a d-axis voltage $v_d$. The d-q reference frame may be a synchronous reference frame with the d-axis of the frame aligned with the AC side voltage measured at the point of common coupling (PCC) of the AC/DC converter 104 with the AC grid (not shown) from which AC/DC converter 104 receives AC power. The generated AC current reference in Eqn. (3) is an indication of the power flow from the AC side to the DC microgrid. The AC current reference is provided to the AC-side current controller or inner current control loop 108 to generate the switching signals of the AC/DC converter.

Figure 1B:
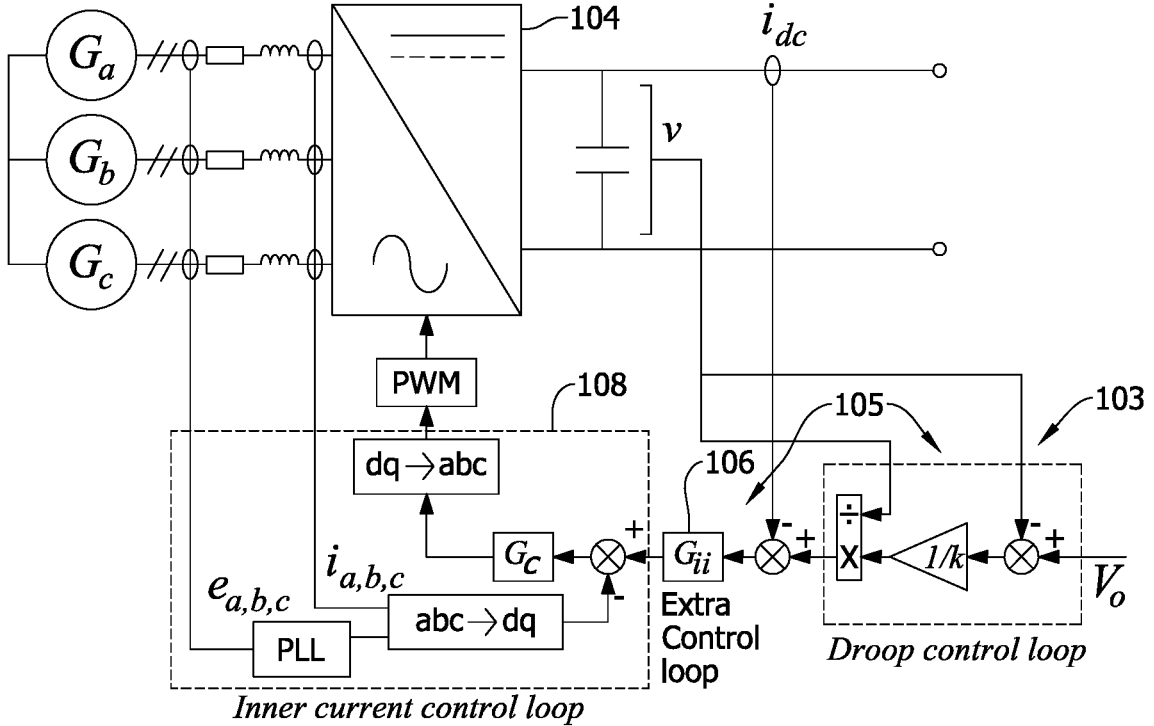
FIG. 1B shows the known PV droop control for an alternate current to direct current (AC/DC) converter.

As shown in FIG. 1B, known PV droop controller 105 includes droop control loop 103 and an extra control loop 106. The extra control loop 106 is required to obtain the AC d-axis current reference i*$_d$ from the DC current reference i*$_{dc}$. Further, the extra PI control loop required extra measurement of the DC side current $i_{dc}$, which is typically not required in the control of an AC/DC converter.

Figure 1C:
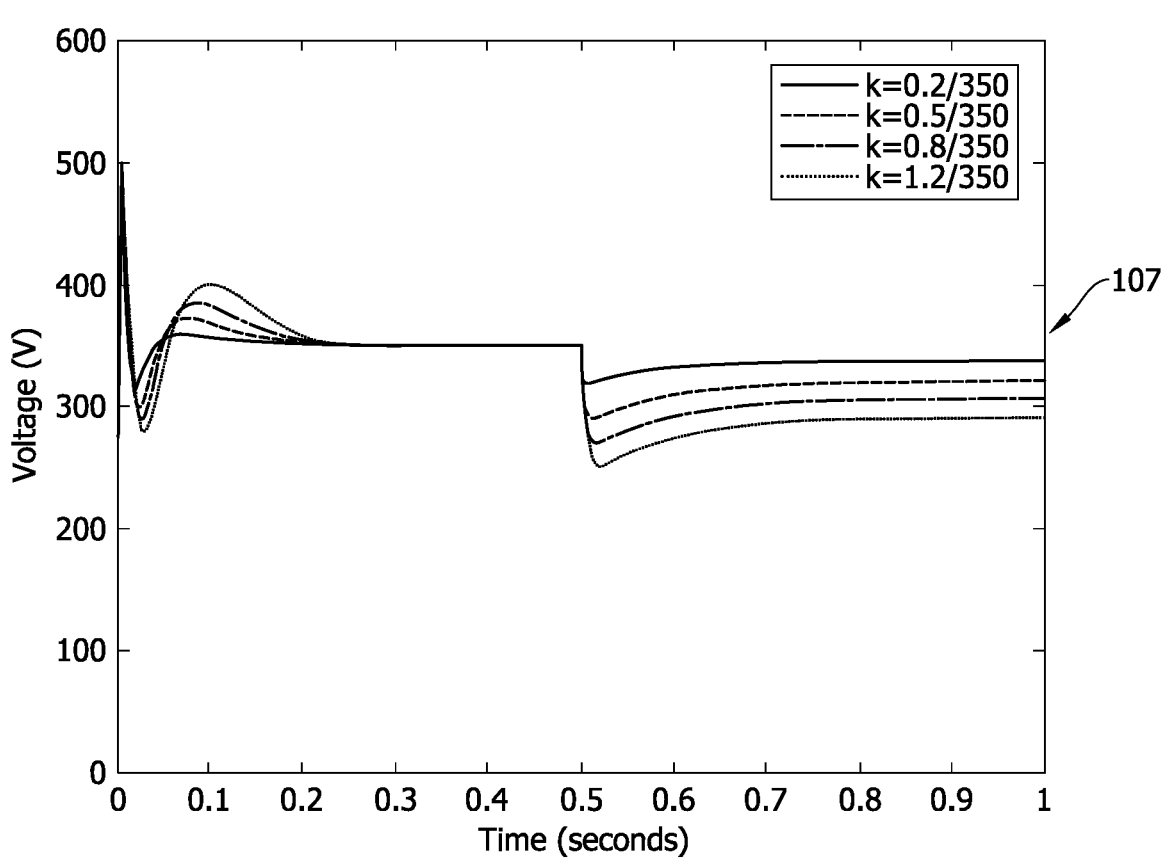
FIG. 1C shows a step response of the known PV droop control for the AC/DC converter shown in FIG. 1B.

The additional control loop 106 also creates stability issues in droop control and the extra pole created by control loop 106 leads to an underdamped step response. FIG. 1C is a plot of the step response, showing the impact of a load step response on the DC bus voltage at various values of droop gain k. The step response has an overshoot. The overshoot may be mitigated through a PI controller design for small loads. For medium to large loads, the transient voltage drop may be excessive, de-stabilizing the DC microgrid.

Figure 1D:
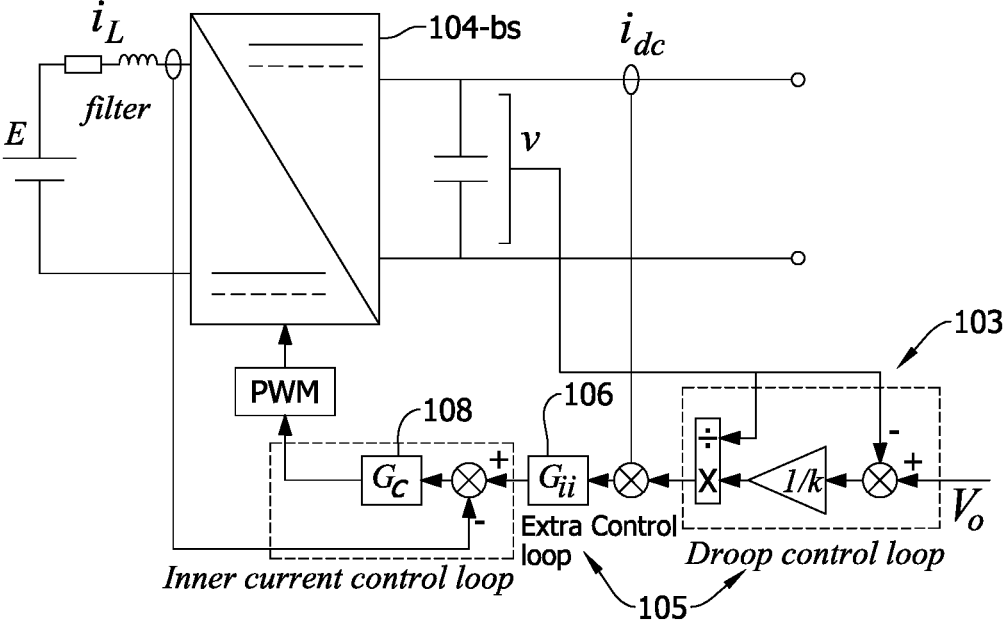
FIG. 1D shows the known PV droop control for a DC/DC boost converter.

FIG. 1D shows a known PV droop control for a DC to DC (DC/DC) boost converter 104-bs. In a boost converter, the output voltage is greater than the input voltage. In the known PV droop control for DC/DC boost converter 104-bs, the DC current reference $$i^*_{dc}$$

is provided to an extra control loop 106 such as a PI controller to generate an input inductor current reference $$i^*_L$$

as follows:

$$i^*_L = \left( \frac{K_{pdc}s + K_{idc}}{s} \right)(i^*_{dc} - i_{dc}). \tag{4}$$

The error between the DC current reference $$i^*_{dc}$$

and the measured DC current $i_{dc}$ are input into a PI controller 106 to generate an input inductor current reference $$i^*_L.$$

The generated current reference $$i^*_L$$

is an indication of the power flow from the input DC bus to the DC microgrid. The input inductor current reference $$i_L^*$$

is given to the inner current control loop 108 of DC/DC converter 104-*bs* to generate the switching signals of the switches in converter 104-*bs*.

As shown in FIG. 1D, the known PV droop control requires an extra control loop 106 to obtain input inductor current reference $$i_L^*$$

from the DC current reference $$i_{dc}^*.$$

Like in AC/DC converter 104, the extra control loop 106 may create stability issues in droop control and the extra pole created by the PI controller may lead to an under-damped step response. Further, the extra control loop 106 requires extra measurement of the DC side current $$i_{dc},$$

which is typically not required in the control of a DC/DC converter.

In contrast, the systems and methods disclosed herein address the problems described above in known droop control mechanisms. The extra control loop is eliminated, thereby increasing the speed of control and stability of the microgrid. An extra measurement of the DC side current $i_{dc}$ is also eliminated, thereby reducing the complexity of the system and cost in hardware and software for the extra sensor of the DC side bus current $i_{dc}$.

Figure 2A:
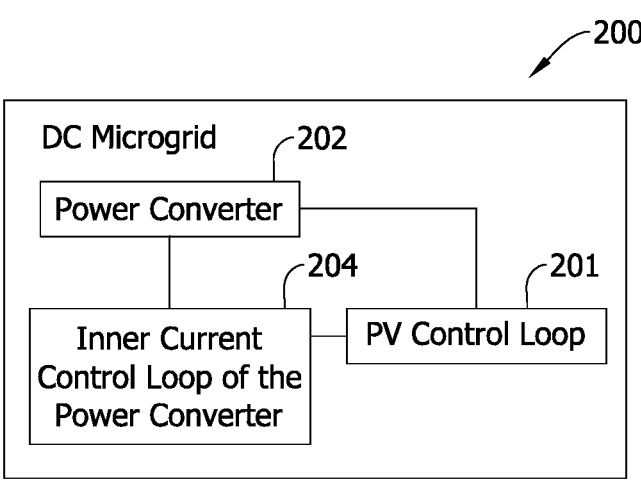
FIG. 2A is a schematic diagram of an example microgrid.

FIG. 2A is a schematic diagram of an example DC microgrid 200 implementing PV droop control mechanisms disclosed herein. In the example embodiment, microgrid 200 includes a power converter 202. Power converter 202 is a DC converter, which converts an AC power or a DC power to a DC power. Power converter 202 may be an AC/DC converter (see FIGS. 3A and 3E described later), a DC/DC boost converter (see FIG. 3C described later), and/or a DC/DC buck converter (see FIG. 3D described later). In a buck converter, the output voltage is smaller than the input voltage. Microgrid 200 also includes an inner current control loop 204 electrically coupled with power converter 202 and configured to control operation of power converter 202. As used herein, "electrically coupled" refers to two components being electrically connected directly or via electrical components between the two components, or receiving inputs from one of the two components to the other one of the two components directly or via components between the two components such as receiving digital inputs in firmware. Inner current control loop 204 is configured to generate switch signals of switches in power converter 202 based on a control quantity such that the output power from power converter 202 meets desired specification, such as desired output voltage.

In the example embodiment, DC microgrid 200 further includes a PV droop control loop 201 electrically coupled with power converter 202 and inner current control loop 204. PV droop control loop 201 may also be referred to as a PV droop controller. PV droop control loop 201 is configured to receive measurements of a droop current quantity that is a current quantity other than a DC bus current of DC microgrid 200. The droop current quantity is used to determine a droop power quantity selected as the power quantity in a PV relationship between the power quantity and the DC bus voltage of DC microgrid 200 in a PV droop control of DC microgrid 200. PV droop control loop 201 is also configured to derive a current reference based on droop in the droop power quantity, where the current reference corresponds to the control quantity of inner current control loop 204. The control in inner control loop 204 is generated by a direct comparison between the current reference and the measured current corresponding to the control quantity. The measured current corresponding to the control quantity may be derived based on the measurements of the droop current quantity.

Figure 2B:
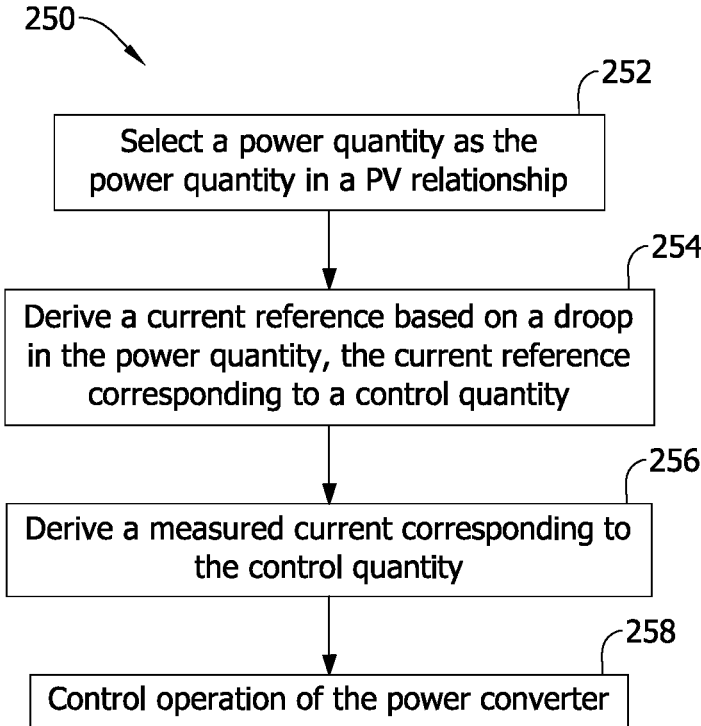
FIG. 2B is a flow chart of a method of PV droop control.

FIG. 2B is a flow chart of an example method of PV droop control. In the example embodiment, method 250 includes selecting 252 a droop power quantity as the power quantity in the PV relationship between the power quantity and the DC bus voltage in the PV droop control of the DC microgrid. The droop power quantity is based on a droop current quantity that is a current quantity other than the DC bus current of the DC microgrid. The droop power quantity may be a fictitious power that is a product of multiplication of the droop current quantity and the DC bus voltage. In some embodiments, the droop power quantity is a real power that is the input power to the power converter. Because the droop current quantity for the droop power quantity is not the DC bus current, a sensor for the DC bus current is not needed in the PV droop control, thereby simplifying the configuration and reducing costs associated with the hardware and software for the sensor. Instead, the droop current quantity is the control quantity or the same type of quantity as the control quantity in the inner current control loop of the power converter. For example, for a AC/DC converter, the droop current quantity may be the input current of the converter, and the control quantity of the inner current control loop may be the d-axis input current of the power converter. For a DC/DC boost converter, both the droop current and the control quantity may be an input current of the power converter. For a DC/DC buck converter, the droop current quantity and the control quantity may both be the output current of the converter. Therefore, the sensor for the droop current quantity has already been included for the control of the power converter.

In the example embodiment, method 250 also includes deriving 254 a current reference based on droop in the droop power quantity, where the current reference corresponds to a control quantity of an inner current control loop of the power converter. Therefore, the current reference may be directly provided to inner current control loop 204 for the control of power converter 202, thereby eliminating extra control loop 106 in the known droop control.

In the example embodiment, method 250 further includes deriving 256 a measured current corresponding to the control quantity based on measurements of the droop current quantity. Because the droop current quantity is the same quantity or the same type of quantity as the control quantity, the measured current corresponding to the control quantity is the measurements of the droop current quantity or a different representation of measurements of the droop current quantity, and may be directly derived from the measurements of the droop current quantity. For example, for a DC/DC boost converter or a DC/DC buck converter, the control quantity and the droop current quantity are the same quantity, and the measured current corresponding to the control quantity is the measurements of the droop current quantity. For a AC/DC converter, the control quantity is the d-axis input current of the power converter while the droop current quantity is the input current in three phases. The d-axis input current is a d-q frame representation of the input current. The d-axis input current may be derived by converting the measured three-phase AC input current into representation in a rotating d-q reference frame.

In the example embodiment, in addition, method 250 includes controlling 258 operation of the power converter by, in the inner current control loop of the power converter, directly comparing the current reference with the measured current, and generating switching signals of switches in the power converter based on the comparing.

With the elimination of the extra sensor for the DC bus current and an extra control loop for generating a current reference for the control quantity in the inner current control loop, microgrids and methods disclosed herein are advantageous over known PV droop control in simplifying the hardware and software and increasing the stability of the microgrids and speed in the control of the power converters.

FIGS. 3A-3D show example PV droop control mechanisms using a fictitious power $P_{fic}$ as the droop power quantity in the PV relationship. In the example embodiments, $P_{fic}$ is the multiplication of the DC bus voltage with inductor current of the converter as in Eqn. (5) below.

$$P_{fic} = P_{fic0} + \frac{V_0 - v}{k'}, P_{fic} = v \times i_{d/L}. \qquad (5)$$

The converter inner current reference $$i^*_{ref}$$

is directly generated from the DC side bus voltage as shown in Eqn. (6) below.

$$i^*_{ref} = \frac{V_0 - v}{k \times v}. \qquad (6)$$

The current reference $$i^*_{ref}$$

is different for different types of converters. In an AC/DC converter 202-ac, current reference $$i^*_{ref}$$

is the AC side d-axis current $$i^*_d$$

Figure 3A:
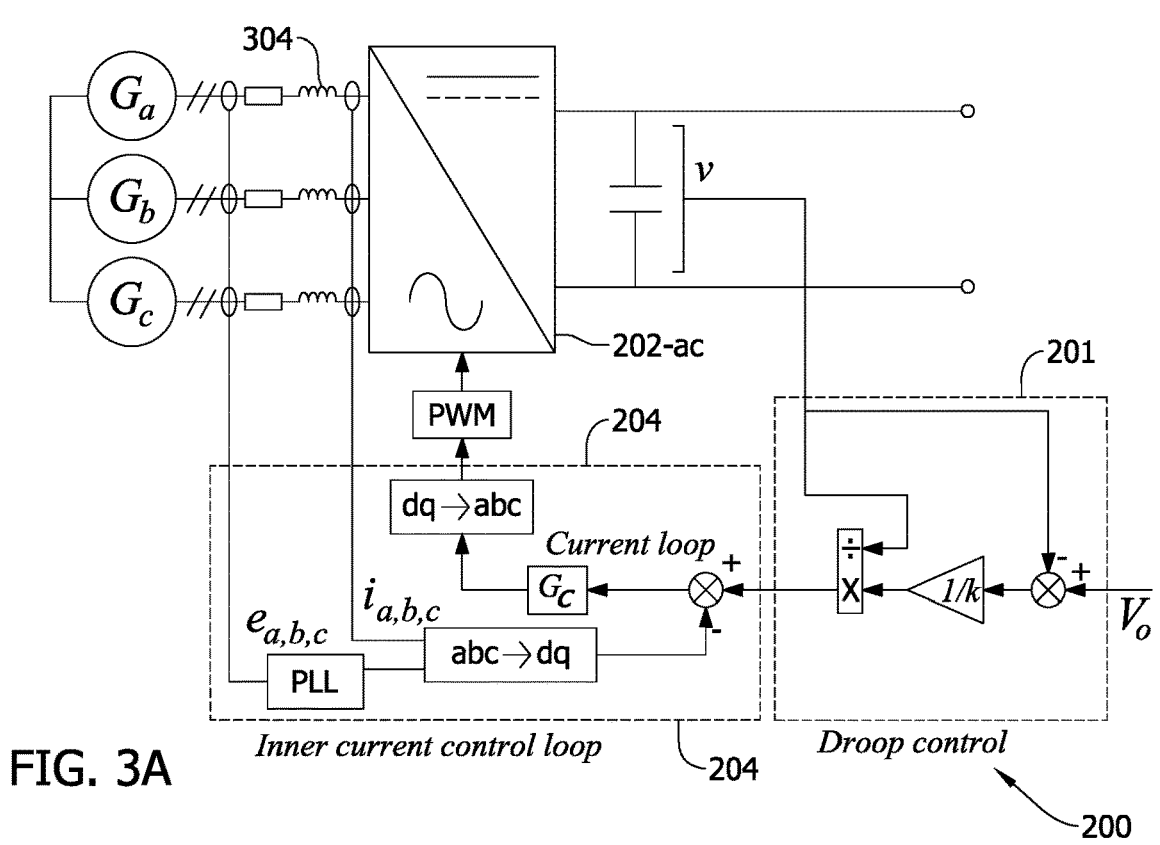
FIG. 3A is an example PV droop control for an AC/DC converter.

(see FIG. 3A). In a DC/DC boost converter, current reference $$i^*_{ref}$$

is the DC side input current $$i^*_L.$$

Figure 3B:
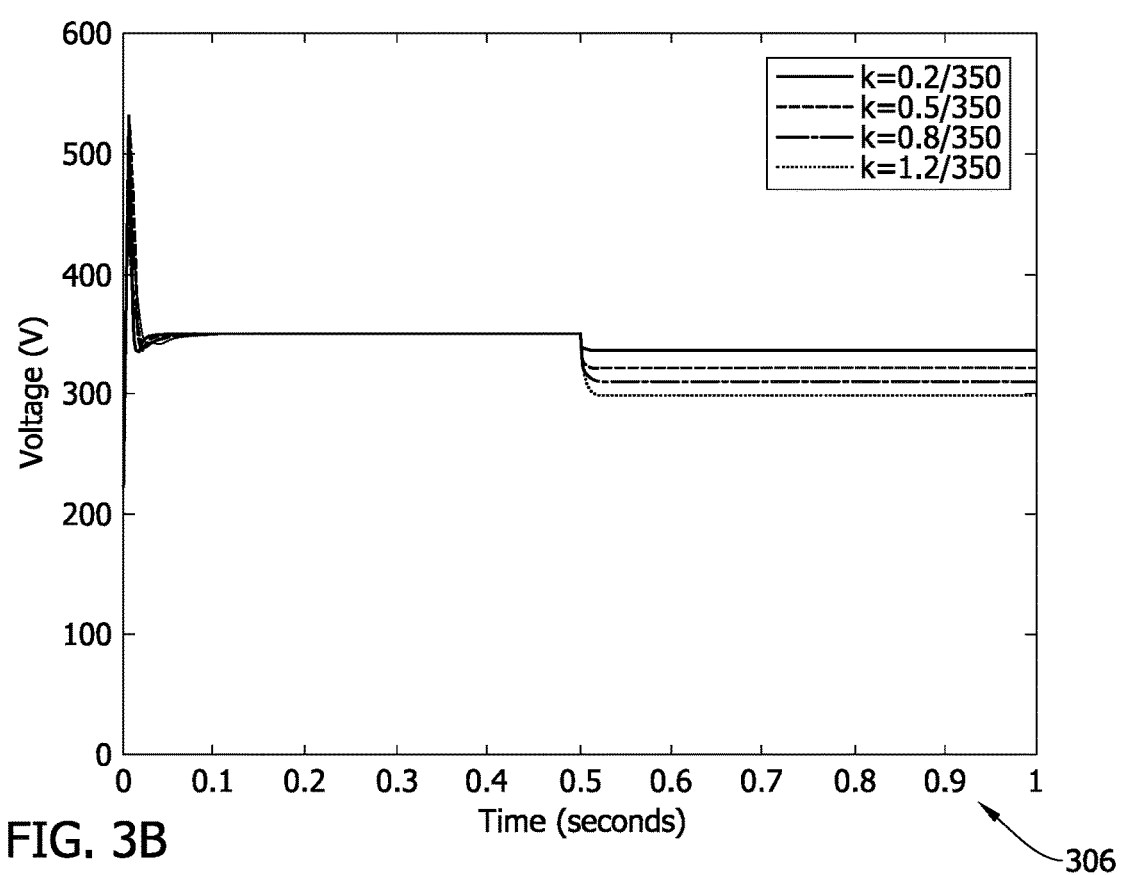
FIG. 3B is a step response of the control for the AC/DC converter shown in FIG. 3A.
Figure 3C:
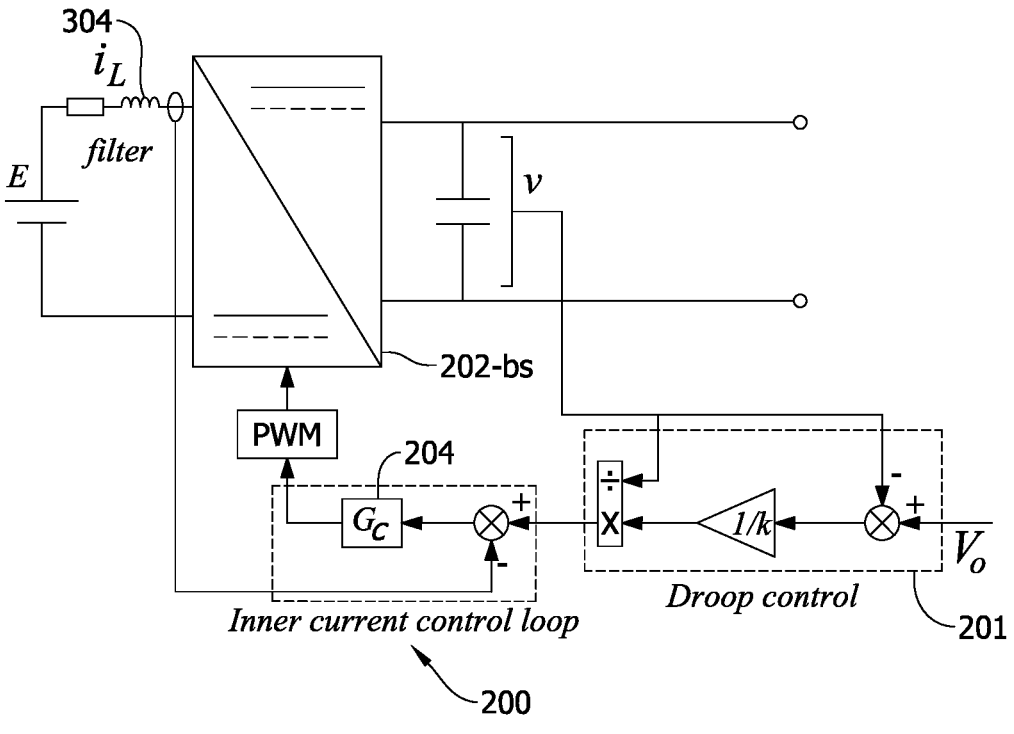
FIG. 3C is an example PV droop control for a DC/DC boost converter.

In the example embodiments, the output of PV droop control loop 201 acts as a reference input to the d-axis current control of the AC/DC converter 202-ac (FIG. 3A) or the input inductor control of DC/DC boost converter 202-bs (FIG. 3C).

In the example embodiments, for AC/DC converter 202-ac, the PV droop regulates a fictitious or power-like quantity $v \times i_d$ against the droop in the DC bus voltage and droop gain k'. The droop gain k' is related to droop gain k in conventional PV droop control and the d-axis grid voltage $E_d$ at no load condition as:

$$k' = \frac{3}{2} k \frac{E_d}{V_0}. \qquad (7)$$

Eqns. (8) and (9) below are derived by taking Eqn. (7) back into Eqn. (6).

$$\frac{3}{2} E_d i^*_{ref} k \frac{v}{V_0} = V_0 - v, \qquad (8)$$

$$k P_{ac} \frac{E_d}{v_d} \frac{v}{V_0} = V_0 - v, P_{ac} \approx \frac{3}{2} v_d i^*_{ref}. \qquad (9)$$

$v_d$ is the d-axis voltage at the input side of the converter. Because the converter loss is negligible at normal operating conditions, the difference ratio between the voltage droops in the PV droop Eqns. (1) and (9) is $$\frac{E_d}{v_d} \frac{v}{V_0}.$$

At normal operating conditions, the voltage droops in Eqns. (1) and (9) are approximately the same or the difference ratio $$\frac{E_d}{v_d} \frac{v}{V_0}$$

is close to 1 because the ratio $E_d/V_0$ between the no-load voltages of the AC and DC sides is approximately in reverse with the ratio $v/v_d$ between nominal voltages of the DC and AC sides. If the loading level is higher, the difference between the voltage droops in Eqns. (1) and (9) is greater, or the difference ratio becomes lower because the converter loss is higher than the line loss, considering converters are often placed close to the grid bus. The changes in the difference ratio indicates at heavy loading conditions, the PV droop control disclosed herein provides a better regulation than the known droop control, which is confirmed by the higher voltage level in FIG. 3B than in FIG. 1C.

In the example embodiments, for a DC/DC boost converter (see FIG. 3C), PV droop control regulates a fictitious or power-like quantity v×i$_L$ against the droop in the DC bus voltage and the droop gain k'. The droop gain k' is related to the droop gain k of the conventional PV droop control and the input DC source voltage E at no load as:

$$k' = k\frac{E}{V_0}. \tag{10}$$

Equations (11) and (12) below are obtained by taking Eqn. (10) back into Eqn. (6).

$$Ei_L^* k\frac{v}{V_0} = V_0 - v, \tag{11}$$

$$kP_{in}\frac{E}{v_{in}}\frac{v}{V_0} = V_0 - v, P_{in} \approx v_{in}i_L^*. \tag{12}$$

v$_{in}$ is the voltage at the input side of the converter 202. Because the converter loss is negligible at normal operating conditions, the difference ratio between the voltage droops in PV droop Eqns. (1) and (12) is $$\frac{E}{v_{in}}\frac{v}{V_0}.$$

At normal operating conditions, the voltage droops in Eqns. (1) and (12) are approximately equal to one another, or the difference ratio is close to 1. At higher loading levels, the difference between voltage droops in Eqns. (1) and (12) is higher, or the difference ratio $$\frac{E_d}{v_{in}}\frac{v}{V_0}$$

becomes lower. The increase in the difference at higher loading levels indicate voltage regulation using the systems and methods disclosed herein is better than the known PV droop control, especially at heavy loading conditions.

In some embodiments, droop gain k' is a variable that changes as a function of time. For example, k'=ƒ(t). In other embodiments, droop gain k' is a variable that changes as a function of another variable. For example, k'=ƒ(x), where x is another variable in the converter or in the DC microgrid.

Figure 3D:
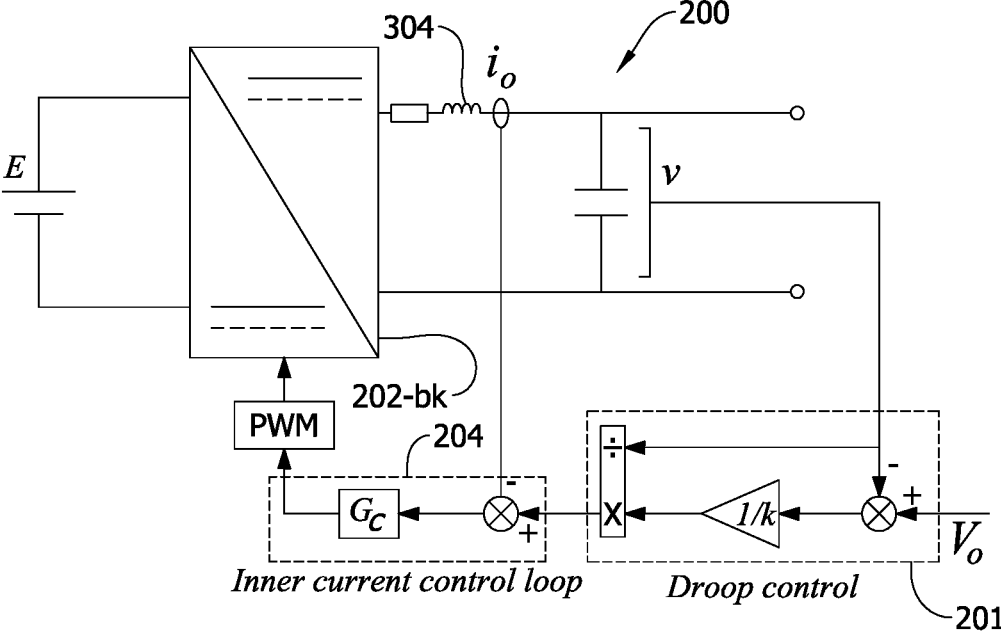
FIG. 3D is an example PV droop control for a DC/DC buck converter.

FIG. 3D shows one more example PV droop control mechanism using a fictitious power for other types of converters such as DC/DC buck converters 202-bk. In the example embodiment, compared to the PV droop control shown in FIGS. 3A and 3C, where the droop current quantity is the input current of converter 202-ac, 202-bs, the droop current quantity is the output current of converter 202-bk. Instead of the inductors being at the input of AC/DC converter 202-ac or DC/DC boost converter 202-bs, the inductor 304 is positioned at the output of DC/DC buck converter 202-bk. The inductor current reference is directly controlled by the output of PV droop control loop 201.

The PV droop control loop 201 using a fictitious power is advantageous over known PV droop controller 105. PV droop control loop 201 is less complex than the known PV droop controller 105 because an extra control loop 106 and an extra DC current measurement are eliminated in PV droop control loop 201. The elimination of the extra control loop also increases the control speed and stability by eliminating the control delay from the extra control loop 106.

Referring back to FIG. 3B, step response 306 of AC/DC converter 202-ac with droop control loop 201 is shown. Plots in FIG. 3B may be directly compared with plots in FIG. 1C, which shows step response 107 of AC/DC converter 104 with known droop controller 105, as the test conditions are made as identical as possible in generating the plots in the two figures. As shown in FIGS. 1C and 3B, both known droop controller 105 and droop control loop 201 settle at a steady state DC voltage of 350 V after the initial start-up transient from zero voltage. At 0.5 seconds, a load step of 5 ohms is applied on the DC bus by closing a switch. Comparing FIG. 3B with FIG. 1C, as discussed above, PV droop control loop 201 is better at regulating DC bus voltage than known PV droop controller 105. Further, the voltage drop is lower using PV droop control disclosed herein than using known PV droop controller 105, when comparing the performance at equivalent droop gains as per Eqn. (4). With PV droop control loop 201, step response 306 of PV droop control loop 201 is overdamped (see FIG. 3B) as compared to the underdamped step response of known PV droop controller (see FIG. 1C).

Figure 3E:
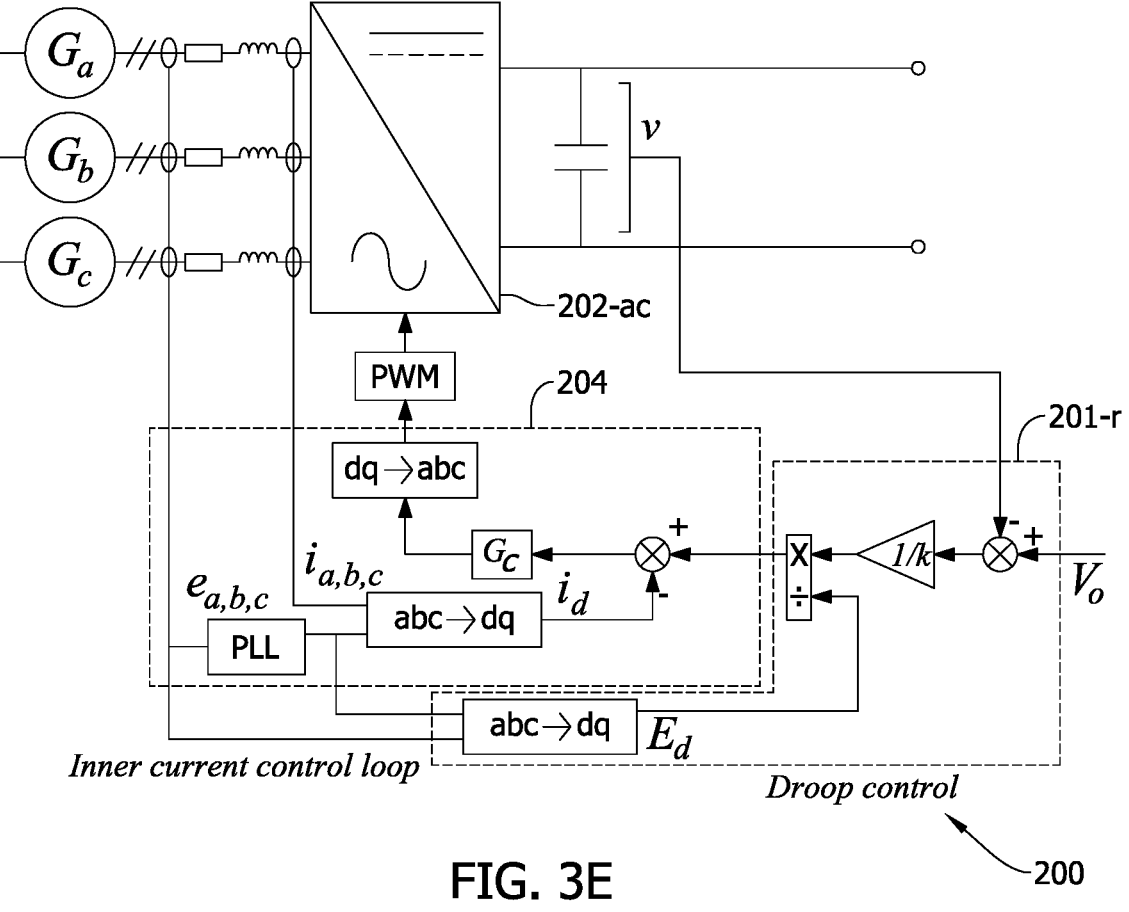
FIG. 3E is another example PV droop control for an AC/DC converter.

FIG. 3E shows one more example PV droop control mechanism. Compared to PV droop control loop 201 shown in FIGS. 3A, 3C, and 3D, which uses fictious power in the PV relationship, PV droop control loop 201-r shown in FIG. 3E uses real power in the PV relationship. In the example embodiment, ignoring the converter loss, the DC side power may be represented by AC side power as follows.

$$P_{ac} = P_{ac0} + \frac{V_0 - v}{k}, P_{ac} = \frac{3}{2}v_di_d. \tag{13}$$

A PV droop control that directly generates the AC side d-axis current reference i*$_d$ from the DC side bus voltage is provided as follows.

$$i_d^* = \frac{V_0 - v}{\frac{3k}{2} \times v_d}. \tag{14}$$

v$_d$ is the d-axis voltage at the AC side. Instead of using measured AC side voltage to derive v$_d$, v$_d$ may be obtained from measured grid side voltage and AC side current. The PV droop control regulates the AC side real power 3/2 v$_d$×i$_d$ against the droop in the DC bus voltage and droop gain k. The droop gain k is functionally the same as the droop gain in known PV droop control. In some embodiments, droop gain k is a variable that changes as a function of time. For example, k=ƒ(t). In other embodiments, droop gain k is a variable that changes as a function of another variable. For example, k=ƒ(x), where x is another variable in the converter or in the DC microgrid.

In the example embodiment, ignoring the loss between the AC grid and the converter, such as the line loss and converter filter loss, the AC side power may be expressed as below.

$$P_{ac} = P_{ac0} + \frac{V_0 - v}{k}, P_{ac} = \frac{3}{2}E_di_d. \tag{15}$$

The PV droop control may be used to derive the AC side d-axis current reference $i^*_d$ as below.

$$i^*_d = \frac{V_0 - v}{\frac{3k}{2} \times E_d}. \tag{16}$$

The d-axis grid voltage, $E_d$, is mostly constant as the magnitude of the AC grid voltage is typically stable and the changing power flow primarily affects the voltage angle.

In the example embodiment, the output of the PV droop control acts as a reference input to the d-axis current control of AC/DC converter 202-ac. FIG. 3E shows the block diagram of the PV droop control. The inner current control is kept the same as the conventional AD/DC rectifier and the droop control is changed with the grid side voltage $E_d$ being introduced to produce current reference $i^*_d$.

Compared to the known PV droop control shown in FIGS. 1A, 1B, and 1D, where the known PV droop control uses the DC side power to regulate the DC bus voltage, the PV droop control shown in FIG. 3E uses the AC side input power to regulate the DC bus voltage. The real power on the AC side is given as:

$$P_{ac} = \frac{3}{2}(v_d i_d + v_q i_q). \tag{17}$$

When the synchronously rotating frame is aligned with $v_d$, $v_q=0$. The AC side real power equation of Eqn. (17) becomes as follows:

$$P_{ac} = \frac{3}{2}(v_d i_d). \tag{18}$$

The relationship between the AC-side real power and the DC output power may be written as below:

$$P_{ac} = P_{dc} + \text{converter losses} + \text{AC filter losses}. \tag{19}$$

Typically, the AC/DC converters operate at high efficiencies, such as 99% or higher. The losses in the AC filter may be minimized via design. Thus, $P_{ac} \approx P_{dc}$ applies in an AC/DC converter system. The PV droop control using the AC side power, however, is advantageous over known PV droop control by eliminating an extra measurement of the DC bus current and an extra control loop 106, thereby simplifying the hardware and software and increasing the speed of dynamic response and the stability of the AC/DC converter.

Compared to the PV droop controls shown in FIGS. 3A, 3C, and 3D, which uses fictitious power in the PV relationship, the PV droop control shown in FIG. 3E uses real power in the PV relationship. When real power is used, the input current and input voltage of AC/DC converter are measured. The AC voltage is noisier than the DC voltage as measured in the schemes shown in FIGS. 3A, 3C, and 3D because power converter 202 may injects switching harmonics into the AC side voltage and the capacitance on the AC side is relatively small. When fictitious power is used, a DC voltage at the output side is measured instead, which has a much larger capacitance, such as one thousand times greater, than the capacitance on the AC side, and therefore is much less noisy than the AC voltage on the input side. Due to the noise, software and hardware for signal processing and filtering for the AC side voltage is needed if real power is used, increasing the complexity in the circuit design.

Figures 4A, 4B:
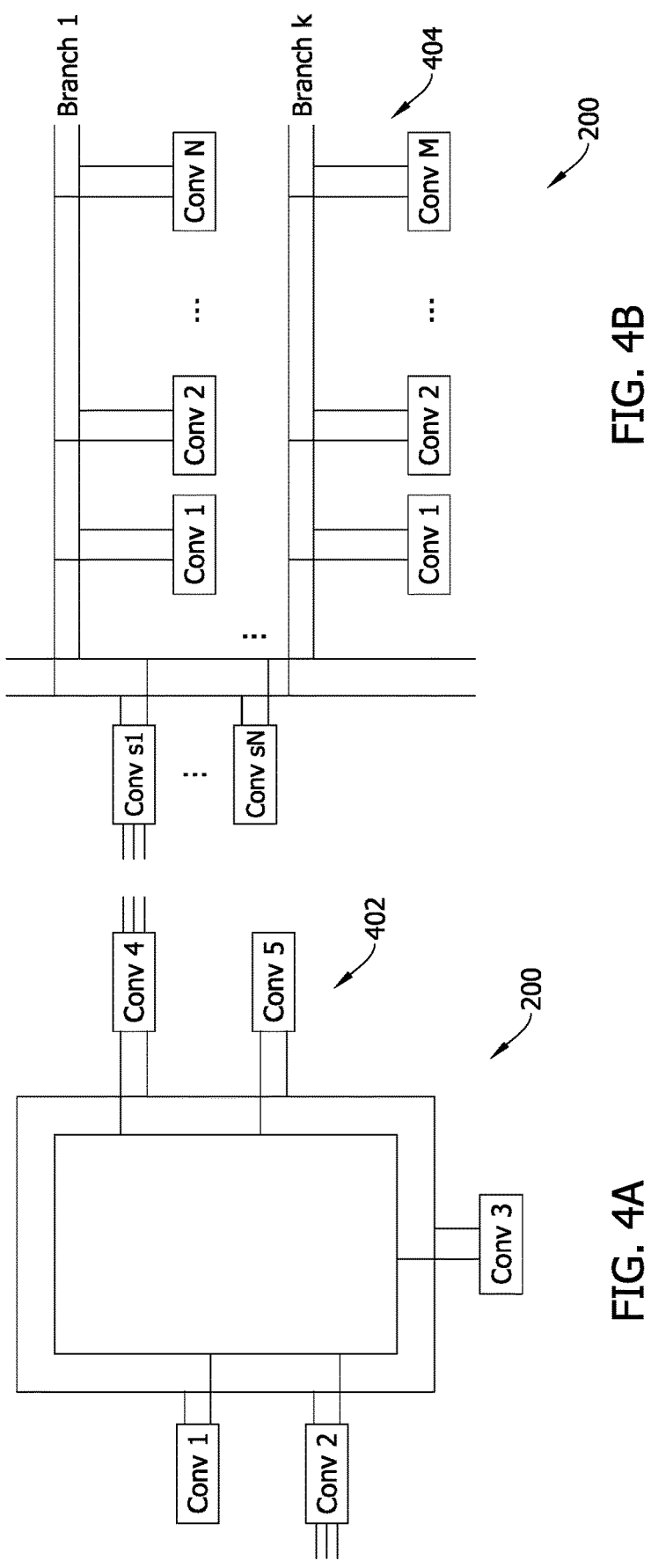
FIG. 4A shows an example microgrid including a plurality of converters.
FIG. 4B shows another example microgrid including a plurality of converters.

FIGS. 4A and 4B show that the PV droop control mechanisms disclosed herein may be used on multiple converters in a DC microgrid. Converters 202 may be connected in a ring configuration 402 (FIG. 4A). Alternatively or additionally, Converters 202 are connected in a distributed configuration 404 (FIG. 4B). Each converter 202 is electrically connected to a source or a load.

Figure 5:
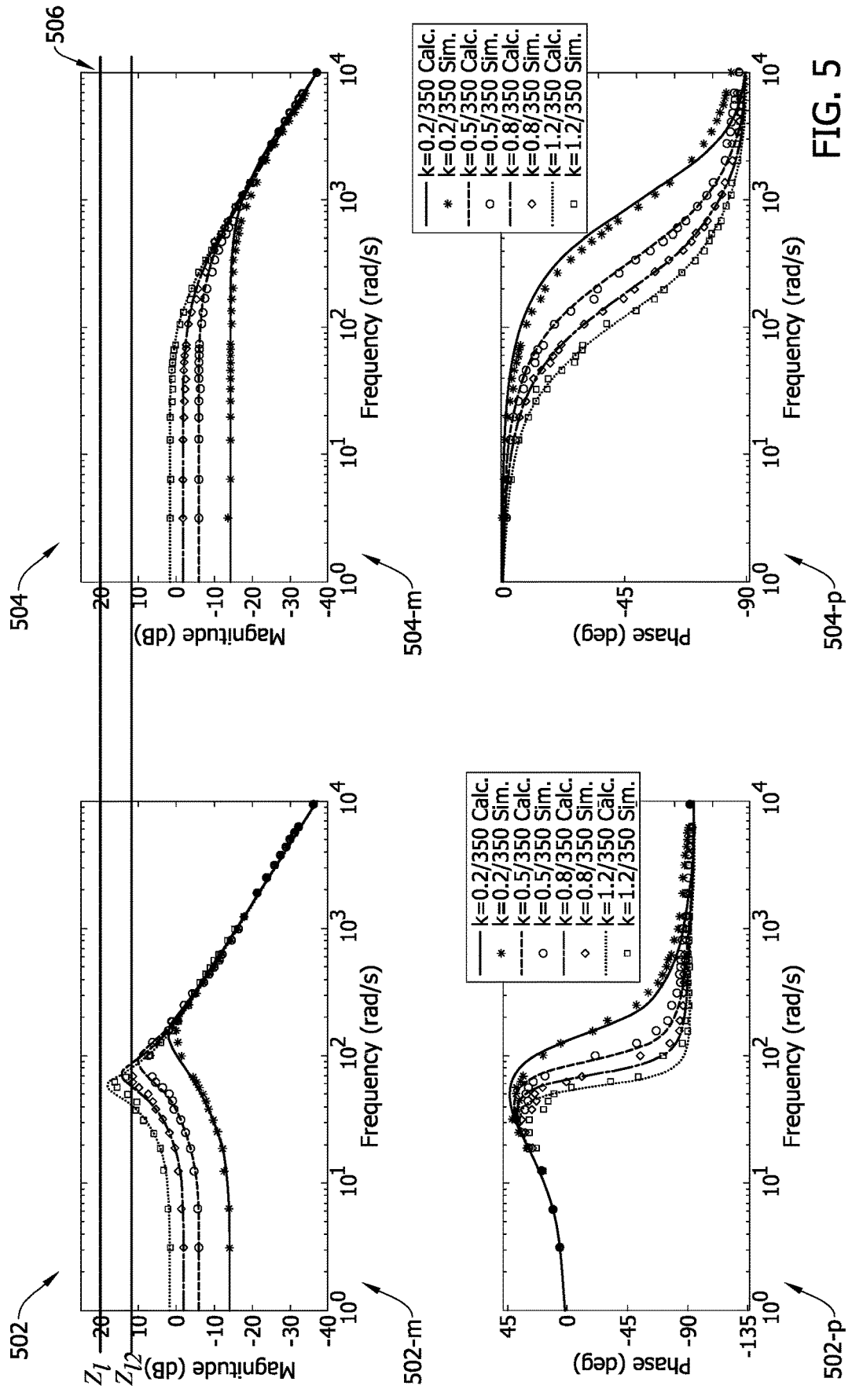
FIG. 5 is a comparison of impedance plots of the PV droop control shown in FIG. 3A with the known PV droop control shown in FIG. 1B.

The performance of droop control loop 201 over known droop controller 105 for AC/DC converters is further analyzed by comparing impedance Bode plots. FIG. 5 shows plots of impedance $Z_s(s)$ of the AC/DC converter 202-ac where the only difference between plots 502 and 504 is the type of the PV droop control being used. Plots 502 are the plots of magnitudes 502-m and phases 502-p of the impedance using known droop controller 105. Plots 504 are the plots of magnitudes 504-m and phases 504-p of the impedance using droop control loop 201. Impedance plots 502, 504 are aligned such that x- and y-axes of plots 502, 504 are identical, facilitating a direct visual comparison between the two plots 502, 504. From the magnitude plots, PV droop in PV droop control loop 201 has a lower quality factor than the PV droop in known PV droop controller 105. Horizontal lines $Z_{l1}$ and $Z_{l2}$ represent two different loads that are applied at the DC terminals of AC/DC converter 202-ac. $Z_{l1} > Z_{l2}$, where the load l2 has a higher power consumption than the load l1.

The power flow stability of the system may be determined by the Middlebrook criterion, where $$\left| \frac{Z_s(s)}{Z_l(s)} \right| \ll 1. \tag{20}$$

The system impedance magnitude $|Z_s(s)|$ is shown in plots 502-m and 504-m. The load impedance magnitude $|Z_l(s)|$ is represented by two lines 506 in plots 502-m, 504-m. For system stability, when PV droop control loop 201 is used, $|Z_s(s)| \ll |Z_l(s)|$ for all frequencies. In contrast, when known PV droop controller 105 is used, load line for $Z_{l2}$ intersects the magnitude impedance plot 502. The differences indicate that PV droop control loop 201 is more stable than known PV droop controller 105, especially for a relatively large loads on the DC bus such as load l2.

Figure 6A:
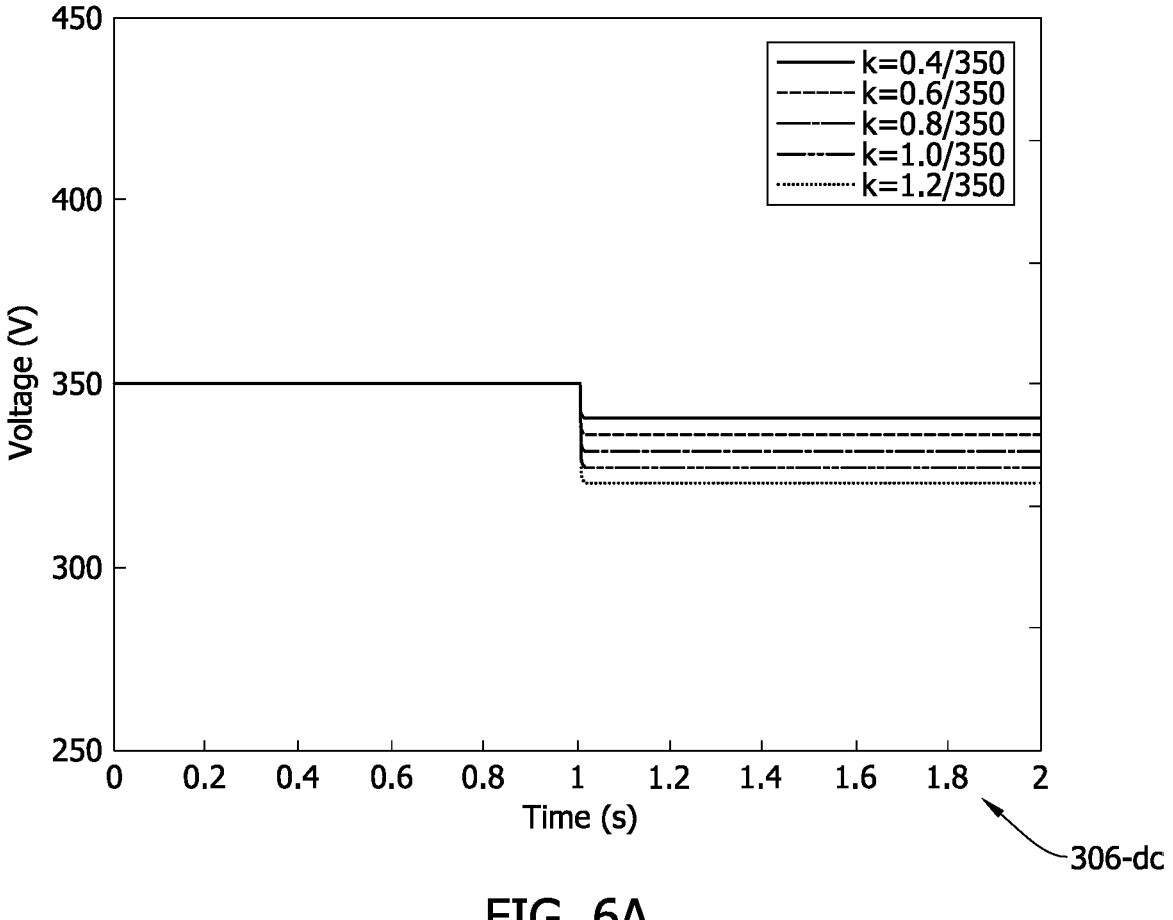
FIG. 6A is a step response of the PV droop control shown in FIG. 3C.
Figure 6B:
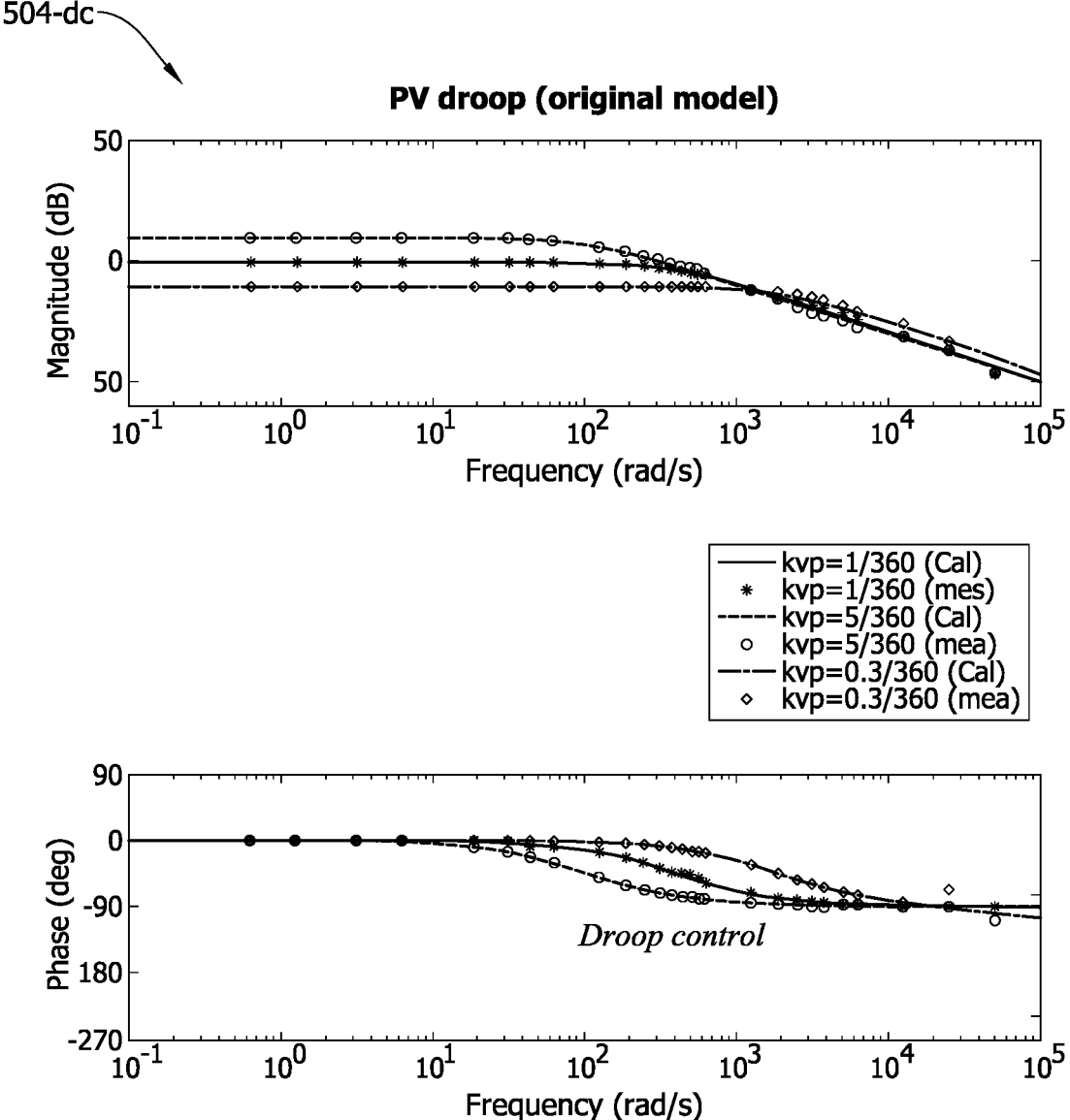
FIG. 6B shows impedance plots of the PV droop control shown in FIG. 3C.

A step response 306-dc (FIG. 6A) and impedance plots (FIG. 6B) of PV droop control loop 201 used in DC/DC boost converter 202-bs with fictious power in the PV relationship are provided. Step response 306-dc/dc and the impedance plot 504-dc/dc are similar to step response 306 shown in FIG. 3B and impedance plots 504 shown in FIG. 5. The step response of PV droop control loop 201 is overdamped, and the PV droop control loop 201 is more stable than known PV droop controller 105.

Figure 7A:
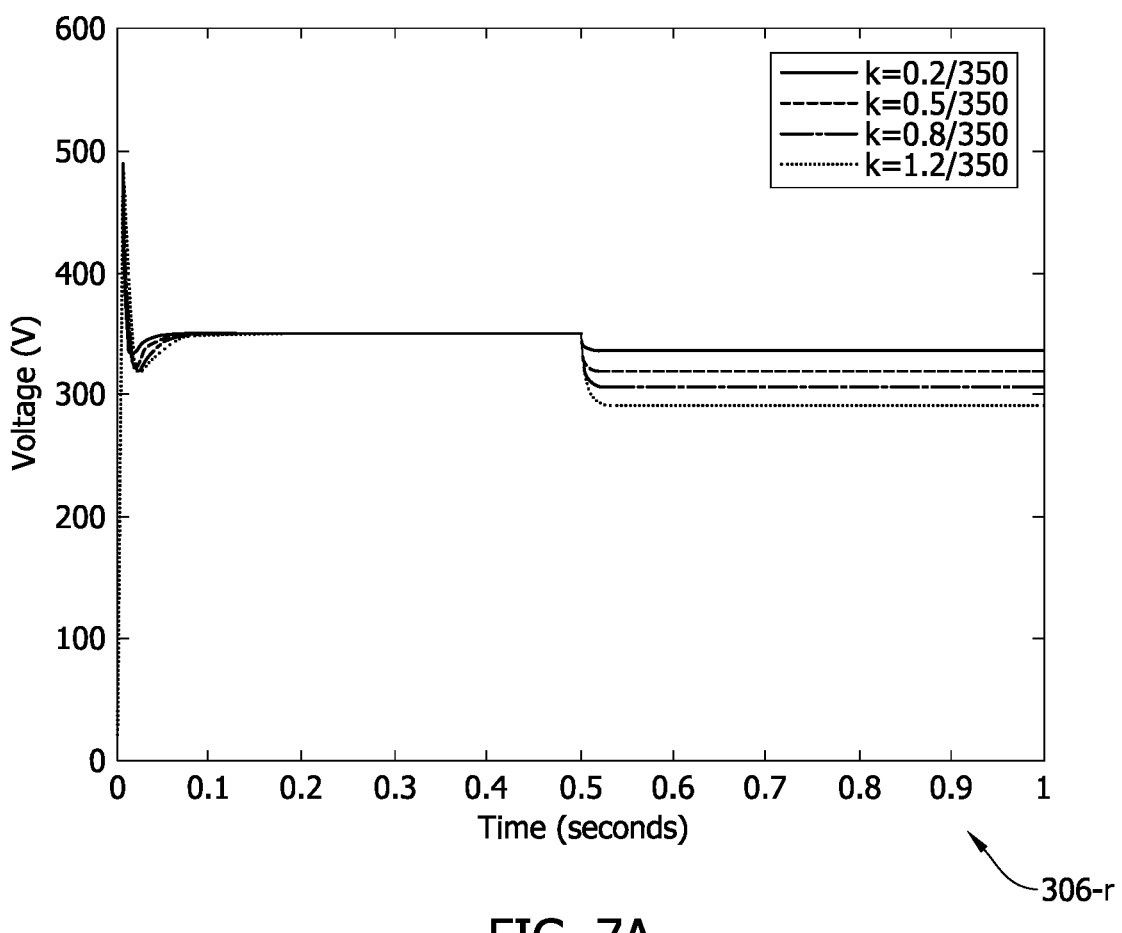
FIG. 7A shows a step response of the PV droop control shown in FIG. 3E.

A step response 306-r (FIG. 7A) and impedance plots (FIG. 7B) of PV droop loop 201 used in AC/DC converter 202-ac with real power in the PV relationship are provided. As shown in FIGS. 1C and 7A, both known droop controller 105 and droop control loop 201 settle at a steady state DC voltage of 350 V after the initial start-up transient from zero voltage. At 0.5 seconds, a load step of 5 ohms is applied on the DC bus by closing a switch. Comparing FIG. 7A with FIG. 1C, PV droop control loop 201 is better at regulating DC bus voltage than known PV droop controller 105.

Figure 7B:
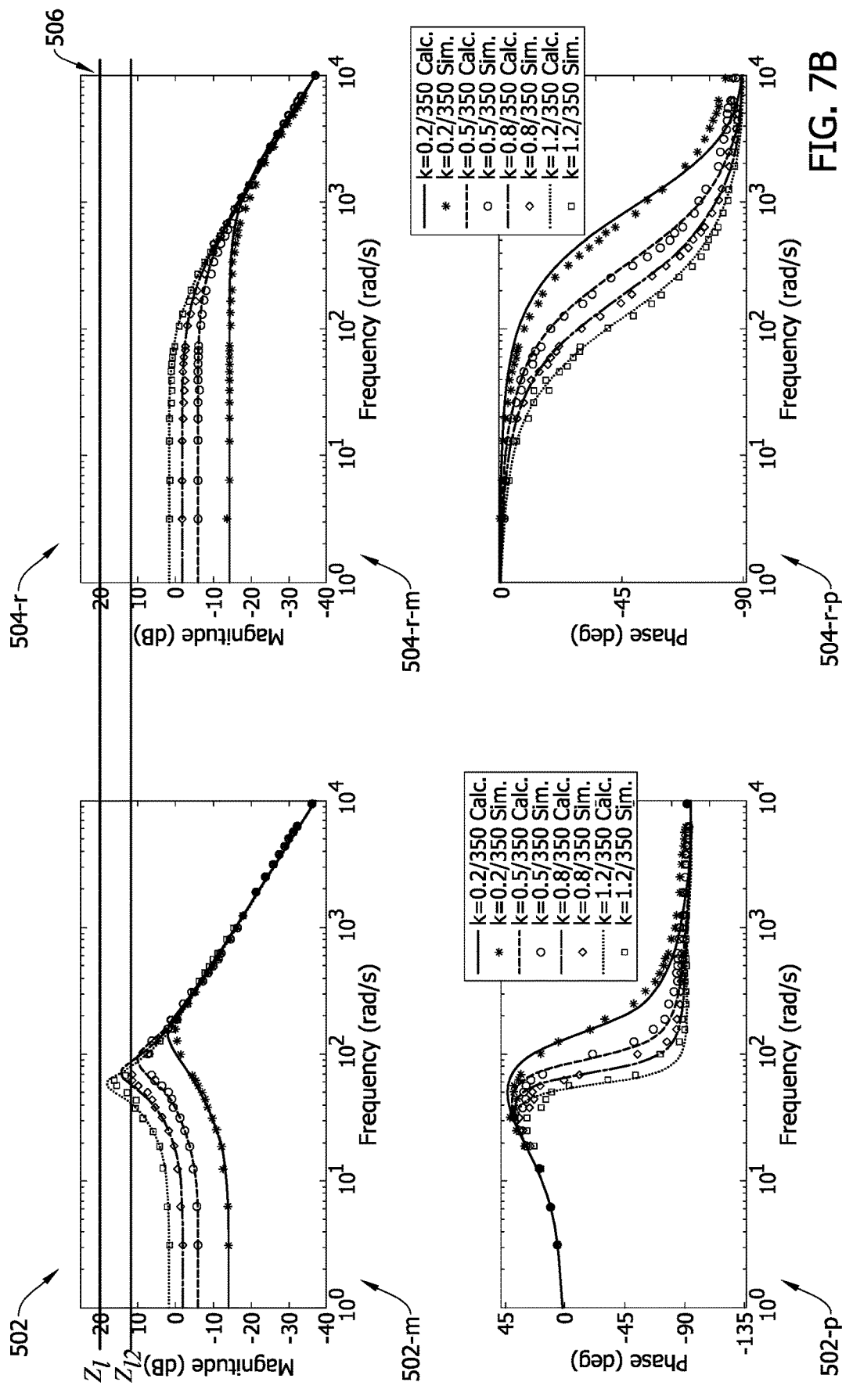
FIG. 7B shows impedance plots of the PV droop control shown in FIG. 3E.

The performance of droop control loop 201 using real power in the PV relationship over known droop controller 105 is further analyzed by comparing impedance Bode plots. FIG. 7B shows plots of impedance $Z_s(s)$ of the AC/DC converter 202-*ac* where the only difference between plots 502 and 504-*r* is the type of the PV droop controller being used. Plots 502 are the plots of magnitudes 502-*m* and phases 502-*p* of the impedance using known droop controller 105. Plots 504-*r* are the plots of magnitudes 504-*r*-*m* and phases 504-*r*-*p* of the impedance using droop control loop 201. Impedance plots 502, 504-*r* are aligned such that x- and y-axes of plots 502, 504-*r* are identical, facilitating a direct visual comparison between the two plots 502, 504-*r*. From the magnitude plots, PV droop in PV droop control loop 201 has a lower quality factor than the PV droop in known PV droop controller 105. Horizontal lines $Z_{l1}$ and $Z_{l2}$ represent two different loads that are applied at the DC terminals of AC/DC converter 202-*ac*. $Z_{l1} > Z_{l2}$, where the load l2 has a higher power consumption than the load l1.

The power flow stability of the system may be determined by the Middlebrook criterion as expressed in Eqn. (20). The system impedance magnitude $|Z_s(s)|$ is shown in plots 502-*m* and 504-*r*-*m*. The load impedance magnitude $|Z_l(s)|$ is represented by two lines 506 in plots 502, 504-*r*. When PV droop control loop 201 is used, $|Z_s(s)| \ll |Z_l(s)|$ for all frequencies. In contrast, when known PV droop controller 105 is used, load line for $Z_{l2}$ intersects the magnitude impedance plot 502. The differences indicate PV droop controller 201 is more stable than known PV droop controller 105, especially for a relatively large loads on the DC bus such as load l2.

In some embodiments, PV droop control loop 201 may be implemented on a controller board using analog circuitry and operational amplifiers. The input voltage is scaled down using a resistor divider or a capacitive voltage divider to a desired low voltage suitable for use on controller boards. Eqn. (6) is implemented on the controller board using operational amplifiers by creating a subtractor circuit. Output of the subtractor is then given as a reference input to the DC microgrid converter's current control algorithm.

In other embodiments, PV droop control loop 201 may be implemented on a controller board inside a microcontroller or FPGA firmware. Input voltage is scaled down using a resistor divider or a capacitive voltage divider to a desired low voltage suitable for use on the controller board. The scaled down voltage is given to the analog to digital converter (ADC) connected to or being included in the microcontroller for use in the firmware as a variable. Eqn. (6) is implemented in the firmware numerically to calculate the converter inner loop current reference, which is then given to the DC microgrid converter's control algorithm.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), field programmable gate arrays (FPGA), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD), and/or other optical media storage devices may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods disclosed herein may be encoded as executable instructions embodied in a computer readable medium, including, without limitation, a storage device and/or a memory device. Such instructions, when executed by a processing device, cause the processing device to perform at least a portion of the methods disclosed herein. The above examples are not intended to limit in any way the definition and/or meaning of the term processor and processing device.

At least one technical effect of the systems and methods disclosed herein includes (a) a PV droop control without the extra measurement of the DC bus current of the microgrid; and (b) a PV droop control without an extra controller to generate a current reference in an inner current control loop of a converter.

Example embodiments of systems and methods of PV droop control are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A direct current (DC) microgrid comprising:
a power converter;
a power-voltage (PV) droop control loop electrically coupled with the power converter, the PV droop control loop configured to:
receive measurements of a droop current quantity that is a current quantity other than a DC bus current of a DC microgrid, wherein the droop current quantity is used to determine a droop power quantity selected as a power quantity in a PV relationship between the power quantity and a DC bus voltage of the DC microgrid in a PV droop control of the DC microgrid; and
derive a current reference based on droop in the droop power quantity, the current reference corresponding to a control quantity of an inner current control loop of the power converter;
the inner current control loop of the power converter electrically coupled with the power converter and the PV droop control loop, the inner current control loop configured to control operation of the power converter by:
deriving a measured current corresponding to the control quantity based on the measurements of the droop current quantity;
directly comparing the current reference with the measured current; and
generating switching signals of switches in the power converter based on the comparing.

2. The DC microgrid of claim 1, wherein the droop power quantity is a fictitious power including a product of multiplication of the DC bus voltage and the droop current quantity.

3. The DC microgrid of claim 2, wherein the droop current quantity is an input current of the power converter.

4. The DC microgrid of claim 3, wherein the power converter is an alternate current (AC) to DC converter and/or a DC to DC boost converter.

5. The DC microgrid of claim 2, wherein the power converter is a DC to DC buck converter, and the droop current quantity is an output current of the power converter.

6. The DC microgrid of claim 2, wherein a droop gain of the PV droop control increases as a loading level of the DC microgrid increases.

7. The DC microgrid of claim 1, wherein a droop gain of the PV droop control is a function of time.

8. The DC microgrid of claim 1, wherein a droop gain of the PV droop control is a function of a variable in the power converter and/or in the DC microgrid.

9. The DC microgrid of claim 1, wherein the DC microgrid comprises a plurality of power converters.

10. The DC microgrid of claim 1, wherein the droop power quantity is an input power of the power converter.

11. A method of power-voltage (PV) droop control in a direct current (DC) microgrid, the method comprising:
selecting a droop power quantity as a power quantity in a PV relationship between the power quantity and a DC bus voltage of a DC microgrid in a PV droop control of the DC microgrid, wherein the droop power quantity is based on a droop current quantity that is a current quantity other than a DC bus current of the DC microgrid;
deriving a current reference based on droop in the droop power quantity, the current reference corresponding to a control quantity of an inner current control loop of a power converter;
deriving a measured current corresponding to the control quantity based on measurements of the droop current quantity; and
controlling operation of the power converter by:
in the inner current control loop,
directly comparing the current reference with the measured current; and
generating switching signals of switches in the power converter based on the comparing.

12. The method of claim 11, wherein selecting the droop power quantity further comprises selecting the droop power quantity as a fictitious power including a product of multiplication of the DC bus voltage and the droop current quantity.

13. The method of claim 12, wherein the droop current quantity is an input current of the power converter.

14. The method of claim 13, wherein the power converter is an alternate current (AC) to DC converter and/or a DC to DC boost converter.

15. The method of claim 12, wherein the power converter is a DC to DC buck converter, and the droop current quantity is an output current of the power converter.

16. The method of claim 12, further comprising selecting a droop gain of the PV droop control, wherein the droop gain increases as a loading level of the DC microgrid increases.

17. The method of claim 11, further comprising selecting a droop gain of the PV droop control as a function of time.

18. The method of claim 11, further comprising selecting a droop gain of the PV droop control as a function of a variable in the power converter and/or in the DC microgrid.

19. The method of claim 11, wherein the DC microgrid includes a plurality of power converters.

20. The method of claim 11, wherein selecting the droop power quantity further comprises selecting the droop power quantity as an input power of the power converter.

* * * * *